United States Patent
Binley et al.

(10) Patent No.: US 10,772,342 B2
(45) Date of Patent: Sep. 15, 2020

(54) SHAPING TOOL FOR FROZEN CONFECTION

(71) Applicant: Conopco, Inc., Englewood Cliffs, NJ (US)

(72) Inventors: Gary Norman Binley, Ashtead (GB); Zhimin Shao, Hangzhou (CN); Lina Sun, Shanghai (CN); Yan Wang, Taicang (CN)

(73) Assignee: Conopco, Inc., Englewood Cliffs, NJ (US)

( * ) Notice: Subject to any disclaimer, the term of this patent is extended or adjusted under 35 U.S.C. 154(b) by 652 days.

(21) Appl. No.: 15/023,504

(22) PCT Filed: Sep. 8, 2014

(86) PCT No.: PCT/EP2014/069055
§ 371 (c)(1),
(2) Date: Mar. 21, 2016

(87) PCT Pub. No.: WO2015/043932
PCT Pub. Date: Apr. 2, 2015

(65) Prior Publication Data
US 2016/0338379 A1    Nov. 24, 2016

(30) Foreign Application Priority Data

Sep. 24, 2013 (WO) ................ PCT/CN2013/084058
Nov. 5, 2013 (EP) ..................................... 13191604

(51) Int. Cl.
*A23G 9/48*    (2006.01)
*A23G 9/22*    (2006.01)
(Continued)

(52) U.S. Cl.
CPC ................ *A23G 9/48* (2013.01); *A23G 9/04* (2013.01); *A23G 9/22* (2013.01); *A23G 9/245* (2013.01);
(Continued)

(58) Field of Classification Search
CPC ........ A23G 3/0097; A23G 9/221; A23G 9/26; A23G 9/04; A23G 9/48; A23G 9/245; A23G 9/22; A23G 9/44; A23G 9/503
See application file for complete search history.

(56) References Cited

U.S. PATENT DOCUMENTS 3,752,678 A    8/1973    Jenkinsont et al.
4,761,128 A    8/1988    Fowler et al.
(Continued)

FOREIGN PATENT DOCUMENTS

CN    1308880    8/2001
CN    101120714    2/2008
(Continued)

OTHER PUBLICATIONS

"Nestle Global" Feb. 16, 2011.*
(Continued)

*Primary Examiner* — Seyed Masoud Malekzadeh
(74) *Attorney, Agent, or Firm* — Gerard J. McGowan, Jr.

(57) ABSTRACT

The present invention is in the field of ice cream shaping, in particular it is relating to a heated tool to imprint a pattern a frozen confectionery product, and especially a heated tool that melts away a channel of an outer coating layer of a frozen confectionery, thereby creating a peelable frozen confectionery product. It is an object of the present invention to provide a shaping tool that is suitable for making cleaner grooves in frozen confectionery products. We have found
(Continued)

that a shaping tool that comprises of at least one heated element provides a molten channel in the outer surface of a frozen confection.

4 Claims, 5 Drawing Sheets

(51) Int. Cl.
    *A23G 9/26* (2006.01)
    *A23G 9/44* (2006.01)
    *A23G 9/24* (2006.01)
    *A23G 9/50* (2006.01)
    *A23G 9/04* (2006.01)

(52) U.S. Cl.
    CPC ............... *A23G 9/26* (2013.01); *A23G 9/44* (2013.01); *A23G 9/503* (2013.01)

(56) References Cited

U.S. PATENT DOCUMENTS

| | | | | |
|---|---|---|---|---|
| 5,265,439 A | * | 11/1993 | Hobelsberger | A23G 3/28 249/55 |
| 5,582,856 A | * | 12/1996 | White | A23G 9/14 426/249 |
| 6,548,097 B1 | * | 4/2003 | Best | A23G 9/04 426/101 |
| 2008/0038420 A1 | | 2/2008 | Dyks et al. | |

FOREIGN PATENT DOCUMENTS

| | | | | |
|---|---|---|---|---|
| CN | 202407004 U | * | 9/2012 | |
| CN | 102840723 | | 12/2012 | |
| EP | 0040989 | | 12/1981 | |
| EP | 0784934 | | 7/1997 | |
| EP | 1767099 | | 11/2009 | |
| EP | 2276324 A1 | * | 1/2011 | ............ A23G 9/221 |
| EP | 2586316 | | 5/2013 | |
| GB | 2005125 | | 4/1979 | |
| GB | 2005125 A | * | 4/1979 | ............ A23G 9/04 |
| WO | WO0130175 | | 5/2001 | |
| WO | WO02052944 | | 7/2002 | |
| WO | WO2012156538 | | 11/2012 | |
| WO | WO2012156539 | | 11/2012 | |

OTHER PUBLICATIONS

IPRP2 in PCT2014069055, Jan. 5, 2016.
Nestle Global, Nestle's first peelable ice cream rolls out worldwide, Internet Citation, Feb. 16, 2011, pp. 1-2; http://www.nestle.com/Media/NewsAndFeatures/Pages/Nestles-first-peelable-icr-cream-roll-out-worldwide.aspx.
Search Report in PCTEP2014069055, dated Nov. 4, 2014.
Written Opinion 1 in PCTEP2014069055, dated Nov. 4, 2014.
Written Opinion 2 in PCTEP2014069055, dated Jul. 10, 2015.
Written Opinion in PCTEP2014069055, dated Oct. 29, 2015, WO.

* cited by examiner

SHAPING TOOL FOR FROZEN CONFECTION

FIELD OF THE INVENTION

The present invention is in the field of ice cream shaping, in particular it is relating to a heated tool to imprint a pattern on a frozen confectionery product, and especially a heated tool that melts away a channel of an outer coating layer of a frozen confectionery, thereby creating a peelable frozen confectionery product. The present invention further relates to a shaped frozen confectionery product.

BACKGROUND OF THE INVENTION

Consumers (especially children) are always looking for frozen confectionery products which provide interesting eating experiences. Products that provide a new shape or appearance are always appreciated. However, it is a constant challenge in the art to find new ways to shape frozen confectionery products.

Products consisting of a core of frozen confection with a jelly-like coating have been known for some years, for example as described in WO01/30175 and U.S. Pat. No. 3,752,678. CN 101120714A discloses a variation on this in which the jelly coating can be peeled off the frozen confection core, in a manner similar to that of peeling the skin off a piece of fruit. However, it can be difficult to peel the jelly coating away from the frozen confection core without part of the coating sticking to the core and/or the coating breaking up into small pieces.

Similarly, frozen confectionery consisting of an inner core of one confection and an outer shell of another confectionery such as a gel have been proposed before. Alternatively the "twister" ice cream by Unilever is a popular example of a frozen confectionery product having distinct confectionery types in a product.

A more recent example of frozen confectionery products with distinct phases are frozen confectionery products comprising of an inner core of typically ice cream or water ice and an outer layer of gel that can be peeled off the core. One example for such a peelable frozen confectionery product is disclosed in WO2012/156539 and WO2012/156538 (NESTEC S.A.).

However the cutting lines in peelable frozen confectionery products as proposed in the art that are currently made by knives on moulds leave distorted edges on the frozen confectionery product, especially on the sides of the product where typically two mould with knives meet the cuts show distorted material around the curing line.

A different kind of shaping tool is disclosed for instance U.S. Pat. No. 4,761,128, describing a moulding tool to shape a frozen confectionary. However in this type of moulding the entire frozen confectionary product is molten into the desired shape. What remains to be desired is a shaping tool that enables selective shaping of a frozen confectionary; in particular to create a channel into the top layer of a frozen confectionary to create a peelable layer.

It is therefore an object of the present invention to provide a shaping tool that is suitable for making cleaner grooves in frozen confectionery products, especially peelable frozen confectionery products.

It is a further object of the invention that the shaping tool provides improved peeling of a frozen confectionery product.

It is still a further object of the invention that the shaping tool provides a distinct channel in the surface of the frozen confection.

It is yet another object to provide a shaping tool for making a peelable frozen confectionery product from a frozen confectionery product that comprises of a core and a shell layer, the shaping tool being suitable for making a clearly distinguishable channel through the shell layer of the product.

We have found that a shaping tool that comprises of at least one heated element provides a molten channel in the outer surface of a frozen confection.

SUMMARY OF THE INVENTION

Accordingly, in a first aspect the invention provides, a shaping tool for frozen confectionery products comprising at least one element, comprising a void with an inner contour corresponding to the outer contour of a product to be shaped, the element comprising at least one shaping means with an extending surface, extending along the inner contour of the void characterised in that the element comprises a heating means.

In a second aspect the invention provides a process for shaping a frozen confectionery product comprising the steps of heating the element comprising the shaping means, impressing the element into the surface of a frozen confectionery, removing the element.

In a third aspect the invention provides a peelable shaped frozen confectionery product, comprising a core and a shell, wherein the peel channels are obtainable by the process according to the invention.

In a fourth aspect the invention provides the use of a shaping tool according to the invention, for providing a peelable confectionery product, characterised in that the confectionary product comprises a core and a shell For the avoidance of doubt, by shaping means is meant a protruding element of a predefined shape that is suitable for creating a shaped impression into the outer surface of a product that it is impressed into. Furthermore, when such a shaping means is heated and the product is a frozen confection, the shaping means—upon being impressed into the surface of the product—melts away frozen confection material it touches.

These and other aspects, features and advantages will become apparent to those of ordinary skill in the art from a reading of the following detailed description and the appended claims. For the avoidance of doubt, any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

BRIEF DESCRIPTION OF THE FIGURES

The figures show embodiments of shaping tools for providing spiral and straight channels in a confectionery product. However the invention is by no means limited to those shapes only.

FIG. 1a shows an opened view of the back of the element.
FIG. 1b shows a view of the front of the element.
FIG. 1c shows the closed element.
FIG. 2a shows the tool with a product inserted before shaping.
FIG. 2b shows during shaping.
FIG. 2c shows after shaping.
FIG. 3a shows an exploded view of the element (E), the intermediate layer (L), the electrical heating block (EHB) and the closing plate (CP).
FIG. 3b shows a closed view.
FIG. 4a shows the tool with a product inserted before shaping.
FIG. 4b shows during shaping.
FIG. 4c shows after shaping.
FIG. 5a shows the tool with a product inserted before shaping.
FIG. 5b shows during shaping.
FIG. 5c shows after shaping.

DETAILED DESCRIPTION OF THE INVENTION

Figure 1A:
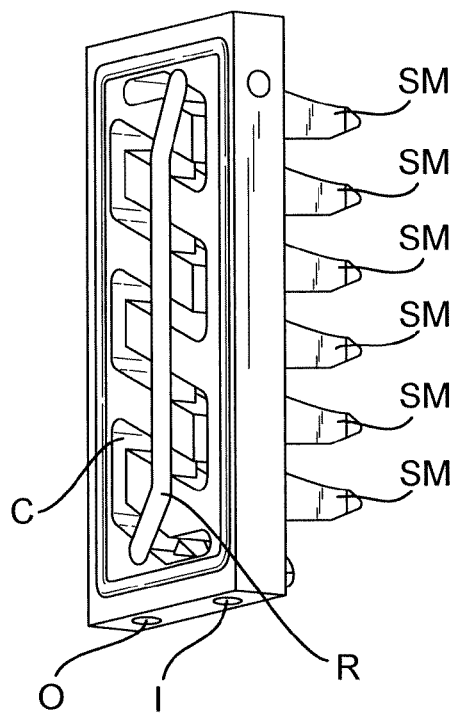
FIG. 1a-1c show a single element of the shaping tool for heating with a fluid or gas.

Accordingly, the invention provides a shaping tool for frozen confectionery products comprising at least one element, comprising a void with an inner contour corresponding to the outer contour of a product to be shaped, the element comprising at least one shaping means with an extending surface, extending along the inner contour of the void characterised in that the element comprises a heating means.

Element

The shaping tool comprises an element comprising a void with an inner contour corresponding to the outer contour of a product to be shaped. The element may be used on one side of the frozen confection or on more than one side.

The element typically has multiple sides, but at least has one side comprising at least one shaping means, and preferably another side connecting to the heating means.

In a preferred embodiment the shaping tool comprises two or more elements that, when put together enclose the entire outer surface of the frozen confection, while the combined shaping means penetrate the outer layer of the frozen confection to the required depth when the combined elements are adjoining and enclose the entire frozen confection.

Preferably the shaping means penetrates the frozen confection to a depth of between 0.1 mm to 1 cm, more preferably at least 0.4 mm, still more preferably 0.6 mm, even more preferably 0.8 mm, or even at least 1 mm; while the depth is typically not more than 8 mm deep, more preferably not more than 6 mm deep, still more preferably not more than 5 mm deep, even more preferably not more than 4 mm deep, or even not more than 3 mm deep.

In a preferred embodiment shaping tool, when there are at least two element, is constructed such that it has an open and a closed position, the open position allowing the frozen confection product to be inserted and removed, while in the closed position the shaping tool at least partially, preferably completely surrounds the frozen confection product such that the shaping means all penetrate the frozen confection to the desired depth at approximately the same time.

The element is preferably made of a heat conducting material, such as metals and heat conducting polymers. Heat conducting ceramics are also contemplated. Metals are the most preferred. Ideally the materials are regarded as food safe.

Banks of shaping tools comprising sets of shaping tools, each comprising more than one element are also contemplated in the scope of the present invention. FIGS. 2 and 4 show examples of such banks.

Shaping Means

Each element comprises at least one shaping means with an extending surface, extending along the inner contour of the void.

The shaping means may have any shape. It may be straight or bent. It may have rounded edge, or square, or any sharp or blunt angle. It may be have a singular shape or a complex form. It may be of a single fixed depth or have variable depths. The resulting decoration of the frozen confectionery product may be as simple as a straight line or a complex detailed decoration, such as a face.

In a preferred embodiment the shaping means has a rounded surface on the protruding edge; being the edge that touches the product for melting a shape, such as a channel, when the tool is in operation. This is preferred to enable the shaping means, when penetrating the outer surface of the frozen confection, leaves a smooth mark; typically a channel.

Each element may comprise more than one shaping means. Preferably each element comprises 2 to 10 shaping means, more preferably at least 3, but typically not more than 8 shaping means per element.

The first and the last shaping means on each element may be shorter than the other shaping means if there is no need to extend further to the top or the bottom of the product.

Heating Means

The element according to the invention and as described above further comprises a heating means.

The heating means may be any conventional heating means known to the skilled person.

Ideally the heating means provides enough energy to heat the element, and in particular the shaping means to a temperature of between 50 and 90° C., preferably at least 55° C., still more preferably at least 60° C., or even at least 70° C., but typically not more than 80° C., or even not more than 75° C.

The heating means provides for easier penetration into the outer surface of the frozen confectionery product and at the same time leaves a smooth molten channel instead of a coarse looking cutting line.

The heating means may be any means that provides heat to the element. Preferably the heating means is provided by heating with a fluid (liquid or gas) heating or electrical heating.

For a typical shaping tool element the required power input is between 5 and 200 W, depending on the complexity of the shape that is created. For a simple line pattern, the power input per element is preferably between 5 and 100 W, preferably between 10 and 80 W. For more complex shapes, the preferred power input is between 20 and 200 Watt. The power may be provided permanently or in pulses.

In case of liquid fluid heating the element comprises of a fluid inlet, a hollow channel travelling through the element and a fluid outlet. The hollow channel may be completely incorporated by the element. Alternatively the element may comprise of more than one part. In case of the latter in a preferred embodiment, the element comprises a first part in which a grove is cut to provide a flow path for the fluid, and a second part to close the top of the groves, thereby providing a fluid channel. The closure may be done in any conventional way, such as by rubber seals, or rings, glue or high pressure; while combinations are also included in the scope of the present invention. A permanently closed system, such a closure obtainable by welding is also considered in the context of the present invention.

The element further comprises a fluid inlet means and a fluid outlet means. Each of there may be done in any conventional way, as long as the inlet and outlet means may be connected to a fluid circulations system as appreciated by the skilled person.

When in operation the fluid temperature is preferably between 55 and 99° C., more preferably at least 60° C., still more preferably at least 65° C., or even at least 70° C., but typically not more than 95° C., more preferably nor more than 90° C., still more preferably not more than 85° C. or even not more than 80° C.

The fluid may be any fluid. Preferably the fluid is a non-corroding or low-corroding fluid. Preferably the fluid is regarded as food safe. Preferably the fluid is water or oil, most preferably water. By water is meant any type of aqueous solution, preferably comprising between 80 and 100% water, more preferably 90 to 100%, still more preferably 95-100% or even 99-100% water.

In case of gas heating the element comprises of a gas inlet, a hollow channel travelling through the element and a gas outlet. The hollow channel may be completely incorporated by the element. Alternatively the element may comprise of more than one part. In case of the latter in a preferred embodiment, the element comprises a first part in which a grove is cut to provide a flow path for the gas, and a second part to close the top of the groves, thereby providing a gas channel. The closure may be done in any conventional way, such as by seals (including rubber seals), or rings, glue or high pressure; while combinations are also included in the scope of the present invention. A permanently closed system, such a closure obtainable by welding is also considered in the context of the present invention.

The element further comprises a gas inlet means and a gas outlet means. Each of there may be done in any conventional way, as long as the inlet and outlet means may be connected to a gas circulations system as appreciated by the skilled person.

When in operation the gas temperature is preferably between 55 and 99° C., more preferably at least 60° C., still more preferably at least 65° C., or even at least 70° C., but typically not more than 95° C., more preferably nor more than 90° C., still more preferably not more than 85° C. or even not more than 80° C.

Preferably the gas is selected from air or steam.

In case the heating means is an electrical heating means, the electrical heating means typically comprises of two electrical leads and a heating block connected to both leads. By heating block is meant any shape of heating block, including flat plated, rods, spheres or any other shape. Preferably the shape of the heating block is such that it matches the outer contour of at least one the side of the element and may follow an inner counter of a front of the element and the at least one shaping means. Ideally the heating block in not connected to the side of the element that comprises the shaping means, but another side; this provides a more homogeneous temperature in the element and the shaping means.

In another embodiment there is provided an intermediate a layer of conductive material between the element and the heating block. Said layer may be a solid layer, or a gel or pasty material. A solid layer is preferred. The solid layer may be reversibly deformable or non deformable. A deformable material is preferred. The most preferred deformable layer materials are heat conducting silicone rubbers. As non-deformable material, metals are also considered.

For the obtaining the most homogeneous temperature in the element with electric heating, it is preferred side of the element, at which the electric heating block is positioned, follows the outer contours of the front of the element and shaping means, thereby making the thickness of the combined element and shaping means approximately constant. By constant in this context is meant that the thickest part is not more than 3 times as thick as the thinnest part, preferably less than 2 times as thick. The hollow cavities in the back of the element are preferably filled with an intermediate layer that corresponds to the shape of the cavities in the element and corresponds to the shape of the heating block in the other side.

In case the element is made of an electricity conducting material, the leads may be directly connected to the element. However, this is more difficult to control and therefore not preferred.

Process

The invention further provides a process for shaping a frozen confectionery product comprising the steps of heating the element, impressing the element into the surface of a frozen confectionery, and removing the element.

During the shaping process, the product is kept in a fixed position, e. g. held by its stick, while the element or elements of the shaping tool are then closed around the product, with the inner contour of their voids, once the shaping tool is closed around the frozen confectionery, the shaping means extending along the inner contour of the void will then penetrate into the outer layer product, thereby melting away the desired material, preferably forming a channel in the outer surface of the frozen confectionery product After shaping, the shaping tool is opened, by moving the elements away from the product, and the product which is now provided with the desired molten channel may be further processed or packaged.

In another embodiment, the shaping tool may be rotated along or around the outer surface of the frozen confectionery product to provide a flowing line on said outer surface.

The shaping process may be used for different kinds of heat molten patterns or shapes. However in the most preferred embodiment, where the shaping tool melts a channel in an outer gel layer of a frozen confection product comprising a core of a frozen confection and a shell of gel, to provide a peelable frozen confectionery product, the pattern is preferably a spiral pattern or a banana peel pattern.

To form a spiral pattern, it is preferred that the element comprises a set at least 2 parallel shaping means, all positioned at an inclined angle, and all positioned at the same distance from the next. In case of using only one element in the process using the shaping tool according to the invention, the element is typically impressed into the outer surface of the confectionery product more than once along the outer contour of the product. Each shaping means on the element typically has two outer end points; and while impressing the element of the shaping to into the surface of the confectionery for a second or further time, it is preferred that at the second or further impression, the corresponding end point left by the impression of the first shaping means, is positioned at the opposite outer end point of the next shaping means upon the next or further impression of the element into the surface, thereby creating a flowing line of a spiral impression along the outer contour of the frozen confectionery product.

In case the shaping tool comprises more than one element each element comprises a set of parallel shaping means, that all are inclined at an angle, such that the outer end of at least all except one of the shaping means of one element, connects to the other outer end of at least all except one shaping means of the next element, thereby forming a flowing line of a spiral impression along the outer contour of the frozen confectionery product.

The impression of more than one spiral is also contemplated in the context of the present invention. Especially a double helix is found to be appreciated by the consumer. Multiple spirals may be impressed either by the positioning of the shaping means in the shaping tool, or applying the same process more than one time, while the frozen confectionery is rotated by 10° to180° around its central axis in either direction.

It is preferred that in case of more than one spiral the rotation of the product around its axis is relative to the number of spirals (n) that are desired as 360°/n plus or minus 90°/n, preferably 360°/n plus or minus 60°/n, more preferably 360°/n plus or minus 30°/n, wherein n is at least 2.

When it is desired to make spirals without rotating the product, this may be achieved by positioning parallel sets of shaping means, whereby to obtain n spirals, sets of n shaping means are required.

Frozen Confection

The frozen confection according to the present invention comprises a core comprising conventional frozen confection and an outer layer (shell) of a gel layer Unless defined otherwise, all technical and scientific terms used herein have the same meaning as commonly understood by one of ordinary skill in the art (e.g. in frozen food manufacture). Definitions and descriptions of various terms and techniques used in frozen confectionery manufacture are found in "Ice Cream", 6th Edition R. T. Marshall, H. D. Goff and R. W. Hartel, Kluwer Academic/Plenum Publishers, New York 2003 and "The Science of Ice Cream", C. J. Clarke, Royal Society of Chemistry, Cambridge, 2004.

Core

Frozen confections are sweet-tasting fabricated foodstuffs intended for consumption in the frozen state (i.e. under conditions wherein the temperature of the foodstuff is less than 0° C., and preferably under conditions wherein the foodstuff comprises a significant amount of ice). Frozen confections include water ices and fruit ices, which comprise water and one or more of sugars, stabilisers, colours and flavours, but little or no fat or protein (e.g. less than 5 wt % of each, preferably less than 2 wt %). Frozen confections also include ice creams, frozen yoghurts, sorbets and the like.

Shell

The core of the frozen confection may be partially or completely covered with a layer of a gel. It is preferred that at least the top and the sides are covered, but preferably also the bottom of the product. The product may be produced for example by coating a preformed frozen confection core with a gel layer which is applied by dipping, spraying, or enrobing; or by means of a fill and suck process in a mould wherein a gel mix is filled into a mould, the core sucked out and then re-filled with frozen confection. In a preferred embodiment, the core is substantially covered by a layer of gel, and scores or notches are present in the gel layer. The scores/notches allow easy peeling of strips of the gel layer, for example in a similar manner to peeling a banana or a spiral peel. The scores/notches may be formed for example by cutting the gel layer after it has been formed, or, when the fill and suck method is used, by using a mould with suitable indentations.

The gel layer may be formed from a mix which contains a gelling agent. The gelling agent may be a thermo-reversible gelling biopolymer such as gelatine or agar. Alternatively the gelling agent may be a chemically setting gelling biopolymer which derives its gel structure from an interaction between the biopolymer and an appropriate ion such as $Ca^{2+}$. Examples include sodium alginate, iota-carrageenan, kappa-carrageenan and pectin. The gelling agent could also be a synergistic combination of two or more biopolymers that may be individually non-gelling, but on mixing will form a gel or a gel of a higher modulus. Examples include: sodium alginate with pectin, xanthan with locust bean gum, agar with locust bean gum, and kappa carrageenan with locust bean gum. The gelling agent is present in an amount such that the gel is sufficiently strong to for the gel layer to cohere so that it does not break apart too easily during peeling. The gel strength can be increased by increasing the amount of the gelling agent in the mix.

The gel may be formed by lowering the temperature (for thermally setting gelling agents) or by combining two separate mix streams, each of which contains one of the components of a chemically setting gelling agent. For example, the mix may be made in two parts, one containing sodium alginate and the other containing a source of $Ca^{2+}$ ions. When the two mixes are combined in the mould, the alginate reacts with the $Ca^{2+}$ to form the gel.

Peel

The frozen confectionery product according to the present invention comprises a core of frozen confection and a gel outer layer; wherein the gel layer comprises a channel that is created by melting away frozen gel material.

Preferably the product comprises notches for easier peeling.

The peel experience of the product according to the invention is more intense due to the clearer peel lines and the easier peeling and more appealing appearance caused by the molten channels.

DETAILED DESCRIPTION OF THE FIGURES

The figures show embodiments of shaping tools for providing spiral and straight channels in a confectionery product. However the invention is by no means limited to those shapes only.

FIG. 1 shows a single element of the shaping tool for heating with a fluid or gas. The element of this figure shows shaping means (SM) for providing a spiral pattern.

FIG. 1a shows an opened view of the back of the element comprising shaping means (SM), wherein the inlet (I) and outlet (O) for a fluid (liquid or gas) are shown as well as a channel (C) through the element. In this particular embodiment, a rib (R) is inserted in the back side of the channel to avoid contact between the incoming and out going fluid.

Figure 1B:
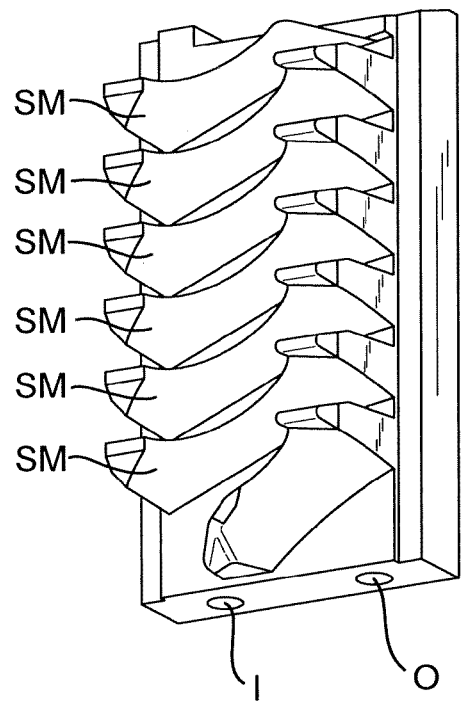

FIG. 1b shows a view of the front of the element. This embodiment shows an element comprising seven shaping means (SM) positioned for spiral shaping of a confectionery product. The inlet (I) and outlet (O) for the fluid are indicated.

Figure 1C:
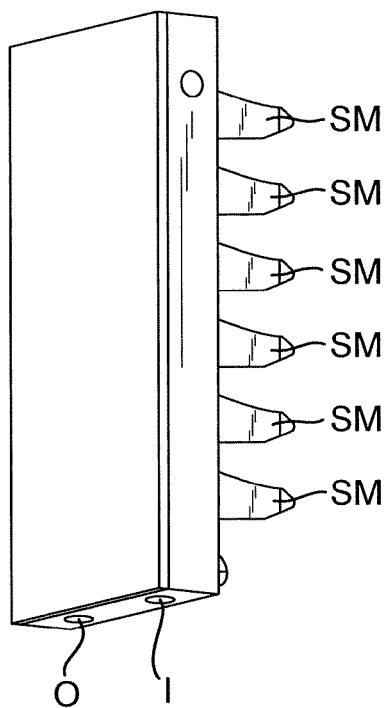

FIG. 1c shows the closed element comprising shaping means (SM), seen from the back and showing the inlet (I) and outlet (O) for the fluid are indicated.

FIG. 2 shows the process of making a spiral peel product with a fluid/gas heated tool. In this embodiment a bank of 3 shaping tools is fit together. The elements of three shaping tools are together positioned on a bank with a shared fluid inlet (I) and outlet (O). The opposing elements of the tool are positioned in the same way.

Figure 2A:
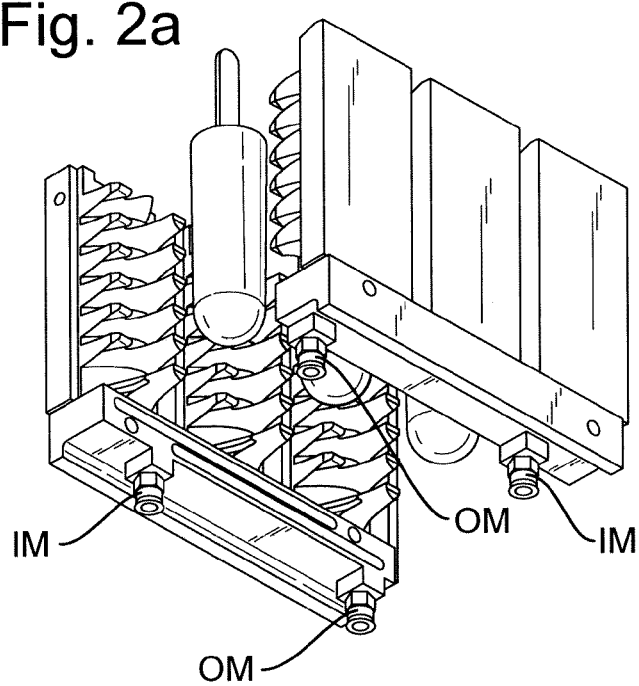
FIG. 2a-2c show the process of making a spiral peel product with a fluid/gas heated tool.
Figure 2B:
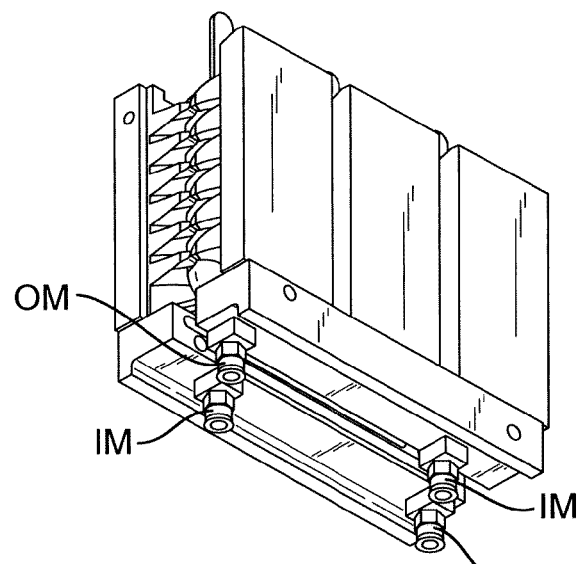
Figure 2C:
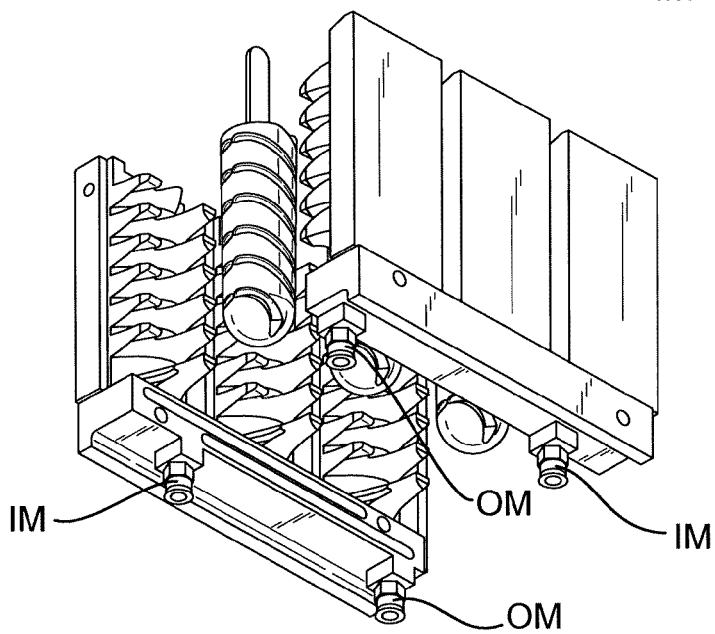

FIG. 2a shows the tool with a confectionery product inserted before shaping, then in FIG. 2b the elements are moved towards each other for shaping; and the heated shaping means melt into the outer part of the confectionery product. When the shaping is completed the elements of the shaping tool are moved apart again as shown in FIG. 2c, and the shaped products can be removed.

FIG. 3 shows a single element of the shaping tool for electrical heating.

Figure 3A:
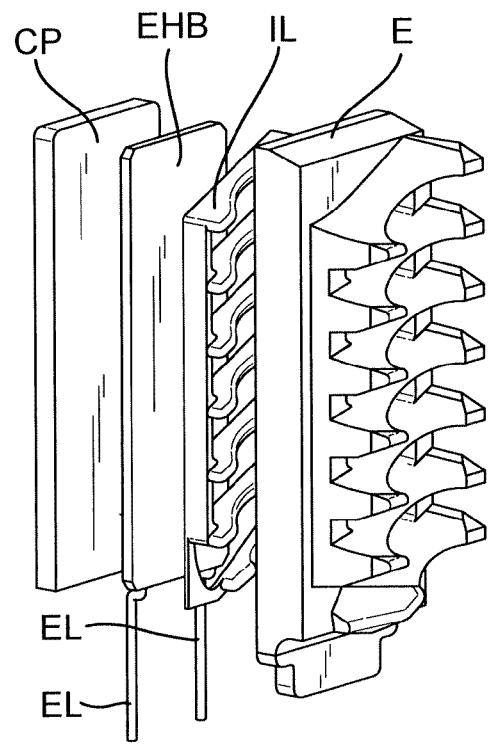
FIG. 3a-3b show a single element of the shaping tool for electrical heating.

FIG. 3a shows an exploded view of the element (E), the intermediate layer (IL), the electrical heating block (EHB), the closing plate (CP) and electric leads (EL)

Figure 3B:
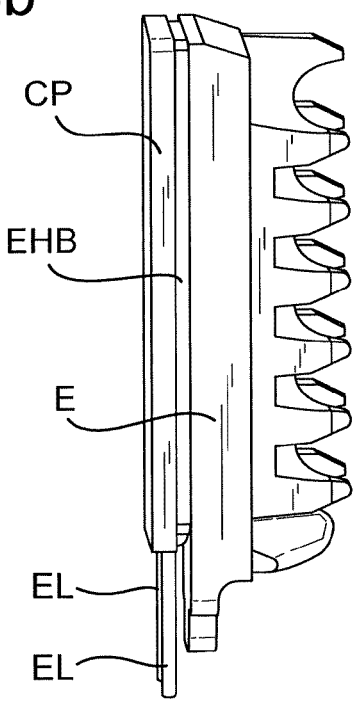

FIG. 3b shows the same element when assembled together; the intermediate layer (IL) is not visible, because it is inside the element (E), but the figures does show the electrical heating block (EHB), the closing plate (CP) and electric leads (EL).

FIG. 4 shows the process of making a spiral peel product with an electrically heated tool. In this embodiment a bank of 3 shaping tools is fit together. The elements of three shaping tools are together positioned on a bank of 3 shaping tools each comprising of 2 elements opposing each other.

Figure 4A:
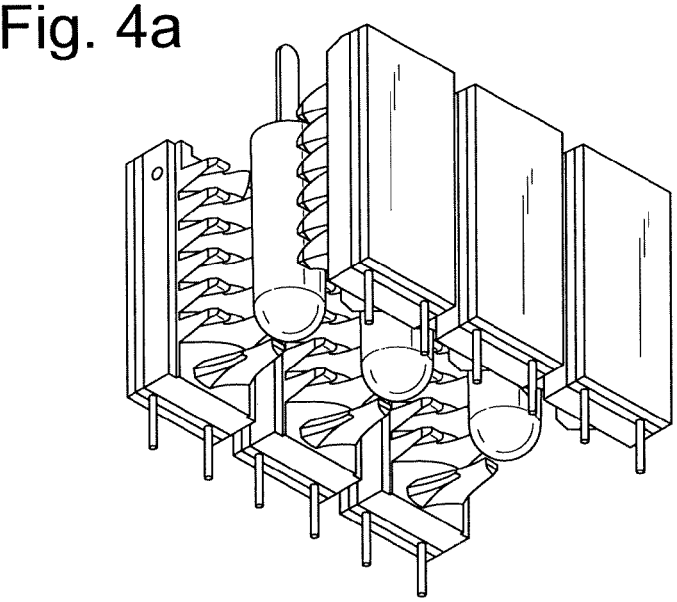
FIG. 4a-4c show the process of making a spiral peel product with an electrically heated tool.
Figure 4B:
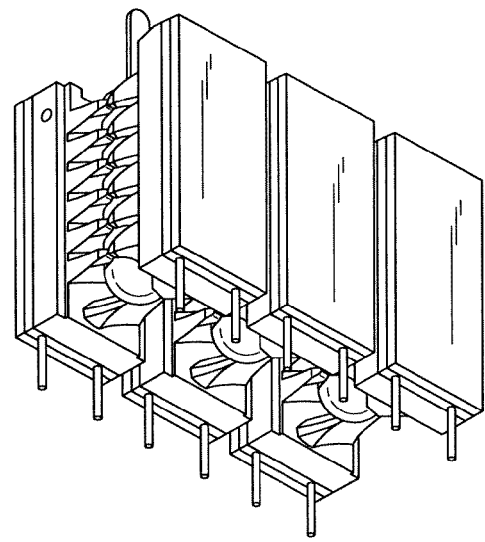
Figure 4C:
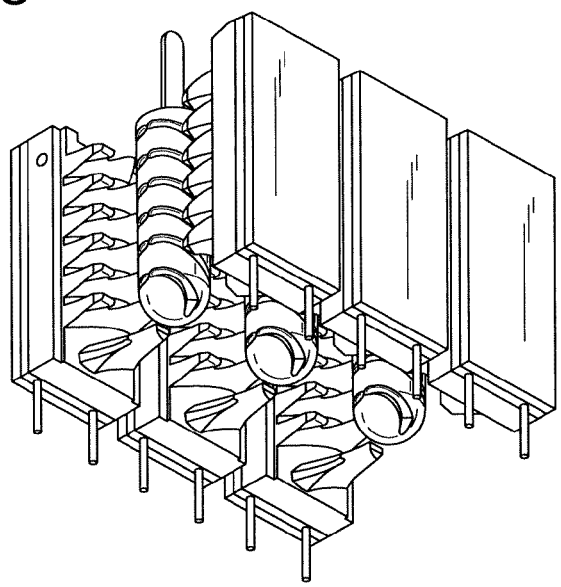

FIG. 4a shows the tool with a confectionery product inserted before shaping, then in FIG. 4b the elements are moved towards each other for shaping; and the heated shaping means melt into the outer part of the confectionery product. When the shaping is completed the elements of the shaping tool are moved apart again as shown in FIG. 4c, and the shaped products can be removed.

FIG. 5 shows the process of making a banana peel product with a fluid heated tool. In this embodiment the tool comprises of 4 elements, each with 1 shaping means. The water inlet (I) and outlet (O) are present on each of the elements.

Figure 5A:
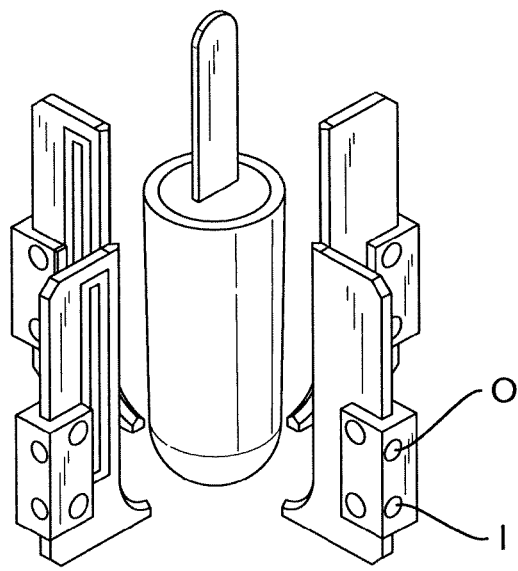
FIG. 5a-5c show a shaping tool for providing a banana peel.
Figure 5B:
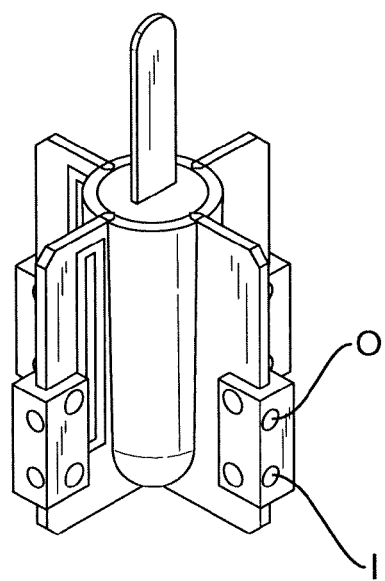
Figure 5C:
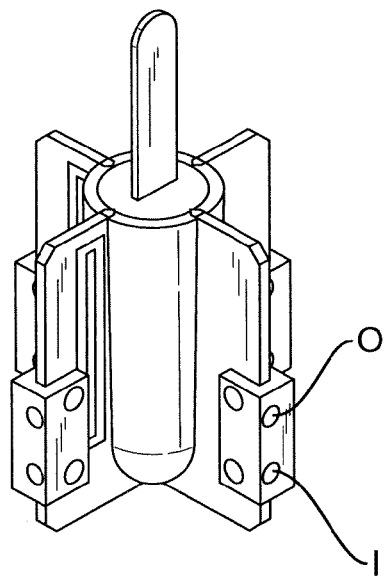

FIG. 5a shows the tool with a confectionery product inserted before shaping, then in FIG. 5b the elements are moved towards each other for shaping; and the heated shaping means melt into the outer part of the confectionery product. When the shaping is completed the elements of the shaping tool are moved apart again as shown in FIG. 5c, and the shaped products can be removed.

EXAMPLES

Example 1: Preparing Spiral Peel Icecream with the Water Heated Tool

The product of this example comprises of an ice cream core and peelable layer of a frozen jelly.

Icecream Core Ingredients and Preparation of the Composition
Sugars 14%
Skimmed milk powder 5%
Coconut oil 4%
Corn syrup 10%
Flavour and colour 0.12%
Stabilizer 0.3%
Water 62.58%

The ice-cream core composition was prepared as follows. The water was heated to 60° C. Then sugar, stabilizer, milk powder, whey powder and oil were slowly added to the tank under agitation to ensure even dispersion of these ingredients. The resulting mixture was pasteurized at 70° C. for 20 minutes and homogenised before cooling down the composition to 4° C. and age for 24 h.

Shell Ingredients (Jelly) and Preparation of the Jelly Composition
Sugars 27%
Corn syrup 40DE 15%
Fruit juice 2%
Gums 0.6%
Citrate acid 0.5%
Flavour and colour 0.12%
Water 54.78%

The Jelly composition was prepared by heating the water to 85° C. and adding part of the sugar and the stabilizer at the ratio of 10:1. The mixture was then mixed for 2 minutes, before adding the remaining sugars and syrups. This mixture was stirred for 10 minutes. The other (minor) ingredients (citric acid, sodium citrate, etc. except the flavour ingredient) were added, followed by the colour ingredient. This composition was stirred at 65° C. for 2 minutes and pasteurized at 81° C. for 30 sec. Then the flavour was added after pasteurization.

The ice-cream product was made by pouring 51 ml of liquid jelly composition (at 55° C.) into a frozen mould. The Jelly was given time to freeze against the mould walls, to form a jelly layer of approximately 3 mm before sucking out the excess liquid jelly composition. This forms the jelly layer shell. The liquid ice-cream composition of the core was added inside the jelly core and frozen in the mould. A stick was inserted and the layered ice-cream product was demoulded.

Shaping the Frozen Confectionery Product

The shaping tool comprising two opposing element (as depicted in FIG. 2) was mounted to a frame with a drive system that is suitable for bringing the sides together. The elements were water heated (see FIG. 1). The elements were connected to a heated the water tank with pipes to form a water circulation system.

The water in the tank was heated to a temperature of 70° C. and a pump was run to circulate the water to the shaping means. The temperature of the shaping means was measured to be 65° C. by the water circulation all through the process.

When shaping the confectionery product, the products were positioned in between the two elements of shaping means (the two shaping means were symmetrical to the centre axes of the product—see FIG. 2a); then the elements of the shaping tool were brought towards the product by drive system to melt the outer layer of the product for 0.3 seconds to form the shape (see FIG. 2b). Then the shaping tool was brought back to its initial position to remove the shaped products (FIG. 2c), and was prepared for next cycle.

The products were provided with nicely formed channels with smooth edges through the outer layer and provided for excellent and easy peelability of the product

Example 2: Preparing Spiral Peel Icecream with the Electrical Heated Tool

The same frozen confectionery product was used as in example 1.

The shaping tool comprising two opposing element (as depicted in FIG. 2) was mounted to a frame with a drive system that is suitable for bringing the sides together. The elements were electrically heated (see FIG. 3). The electric leads of each of the heating blocks were connected to a 24V, 50 W power supply.

The temperature of the shaping means was measured to be 65° C. by the electric power supply all through the process.

The shaping tool comprising two opposing element (as depicted in FIG. 4) was mounted to a frame with a drive system that is suitable for bringing the sides together. The elements were water heated electrically (see FIG. 3).

When shaping the confectionery product, the products were positioned in between the two elements of shaping means (the two shaping means were symmetrical to the centre axes of the product—see FIG. 4a); then the elements of the shaping tool were brought towards the product by drive system to melt the outer layer of the product for 0.3 seconds to form the shape (see FIG. 4b). Then the shaping tool was brought back to its initial position to remove the shaped products (FIG. 4c), and was prepared for next cycle.

The products were provided with nicely formed channels with smooth edges through the outer layer and provided for excellent and easy peelability of the product.

Example 3: Preparing of a Decorated Layered Ice-Cream Product

The product of this example comprises of an ice cream core and shaped outerlayer made of waterice.
Shell Ingredients and Preparation of the Water Ice Composition
Sugars 24%
Stabilizer 0.2%
Citrate acid 0.5%
Flavour and colour 0.12%
Water 75.18%

The water ice composition was prepared by heating the water to 85° C. and adding all the ingredients except the flavour ingredient and colour. This mixture was stirred for 10 minutes. This composition was pasteurized at 81° C. for 30 sec. Then the flavour and colour was added after pasteurization.

The ice-cream product was made by pouring 51 ml of liquid water ice composition (at 4° C.) into a frozen mould. The water ice was given time to freeze against the mould walls, to form a layer of approximately 3 mm before sucking out the excess liquid composition. This forms the water ice layer shell. The liquid ice-cream composition of the core was added inside the core and frozen in the mould. A stick was inserted and the layered ice-cream product was demoulded.

The shaping was done as in Example 1.

The products were provided with nicely formed channels with smooth edges through the outer layer of the product.

The invention claimed is:

1. Shaping tool for frozen confectionery products comprising at least one element, comprising a void with an inner contour corresponding to the outer contour of a product to be shaped, the element comprising at least one shaping means with an extending surface, extending along the inner contour of the void characterised in that the element comprises a heating means; wherein the heating means is an electrical heating means, comprising a heating block positioned on a back side of the element other than a front side comprising the shaping means; and wherein the back side of the element, at which the electric heating block is positioned and matches, forms a back-contour that follows the inner contour of the front of the element and the at least one shaping means wherein the shaping tool is suitable for providing a spiral pattern, wherein the element comprises a set of at least three parallel shaping means, all positioned at an inclined angle, and all positioned at the same distance from a next one of the parallel shaping means, wherein the shaping means each comprises a protruding edge with a surface configured to penetrate an outer surface of the respective frozen confectionary product to form a shape.

2. A tool according to claim 1, wherein the tool comprises at least two elements.

3. A tool according to claim 1, wherein the electrical heating means further comprises an intermediate layer between the heating means and the element.

4. A tool according to claim 1, wherein the at least one shaping means has a protruding edge having a rounded surface.

* * * * *